Aug. 28, 1951  E. S. PRINCE ET AL  2,565,626
DRIVING GEAR FOR DRINK MIXING DEVICE OR THE LIKE
Original Filed Oct. 4, 1945  4 Sheets-Sheet 2

INVENTORS.
Earl S. Prince
John Brotheridge
By: Moore, Olson & Trexler
Attys.

Aug. 28, 1951  E. S. PRINCE ET AL  2,565,626
DRIVING GEAR FOR DRINK MIXING DEVICE OR THE LIKE
Original Filed Oct. 4, 1945  4 Sheets—Sheet 3

INVENTORS.
Earl S. Prince
John Brotheridge
By:- Moore, Olson & Trexler
attys.

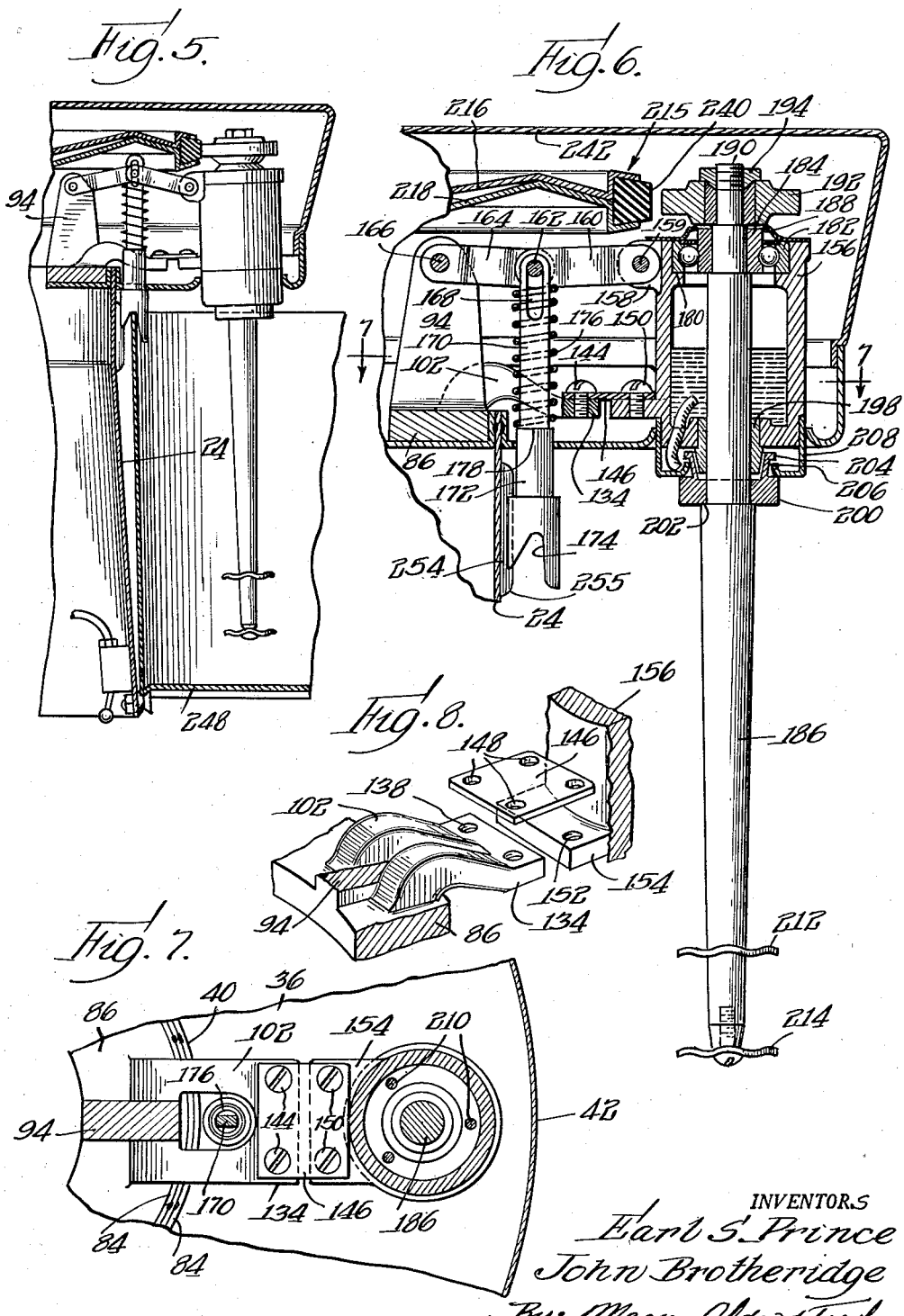

Patented Aug. 28, 1951

2,565,626

UNITED STATES PATENT OFFICE 2,565,626

DRIVING GEAR FOR DRINK MIXING DEVICE OR THE LIKE

Earl S. Prince and John Brotheridge, Rock Falls, Ill., assignors to Prince Castle Manufacturing Division, Inc., Sterling, Ill., a corporation of Illinois Original application October 4, 1945, Serial No. 620,304. Divided and this application July 26, 1947, Serial No. 763,818

5 Claims. (Cl. 74—206)

This invention relates to a driving gear for multiple spindle drink mixing devices although the invention may be of broader application.

The present application is a division of our pending application Serial No. 620,304, filed October 4, 1945, now Patent No. 2,531,989, for Multiple Drink Mixing Machine.

Among the objects of the present invention is to provide a relatively large motor driven driving wheel for the separate spindles of a drink mixer wherein the driving wheel is formed of sheet metal and provided with a replaceable tire which in its rotation is adapted to engage driven wheels on separate spindles of drink mixers.

Another object of the invention resides in the provision of a driving wheel formed of a plurality of sheet metal disks which are assembled to a driving hub in a manner to provide simplicity and ruggedness in construction, economy in manufacture, and efficiency in operation.

Yet another object of the invention resides in providing a driving wheel of the character described, composed of a pair of sheet metal disks, and wherein the same are clamped to a hub member adapted to be driven.

Yet another object of the invention resides in the construction of the outer portion of the disks wherein the same form a peripheral channel for the reception of replaceable rubber tire.

These and other objects of the invention will be apparent from a perusal of the following specification when taken in connection with the accompanying drawing, wherein:

Figure 5 is a fragmentary sectional view showing the device in driving position;

Figure 6 is a vertical section taken on the line 6—6 of Figure 3;

Figure 7 is a plan section taken on the line 7—7 of Figure 6; and

Figure 8 is a detail perspective view of the spring mounting.

Inasmuch as this divisional application relates only to the construction of the driving wheel, the other irrelevant parts of the drink mixing device illustrated and claimed in the parent application are not herein disclosed.

Figure 1:
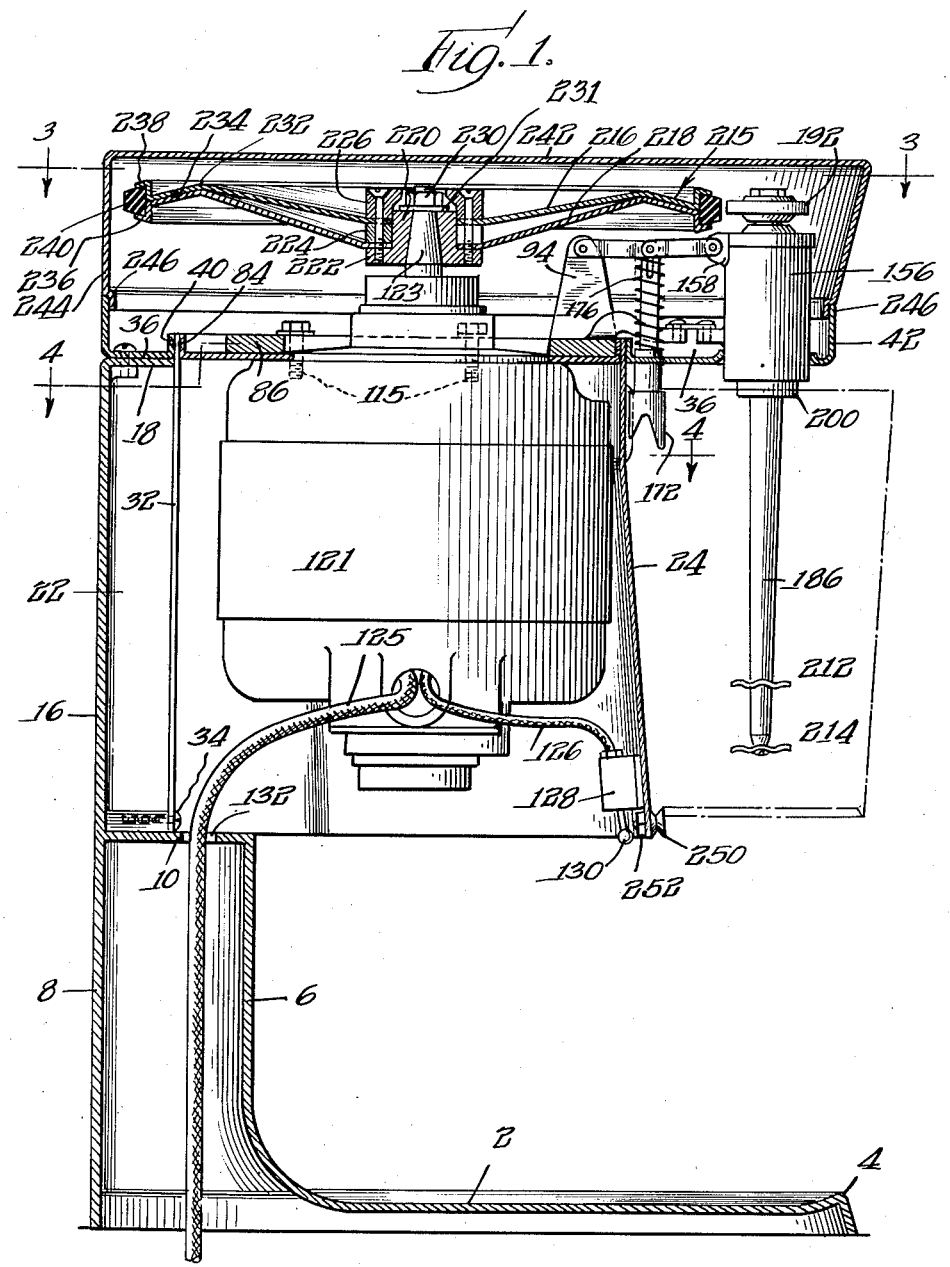
Figure 1 is a vertical sectional view taken substantially along the central axis of the device, showing our sheet metal driving member in cross section.
Figure 2:
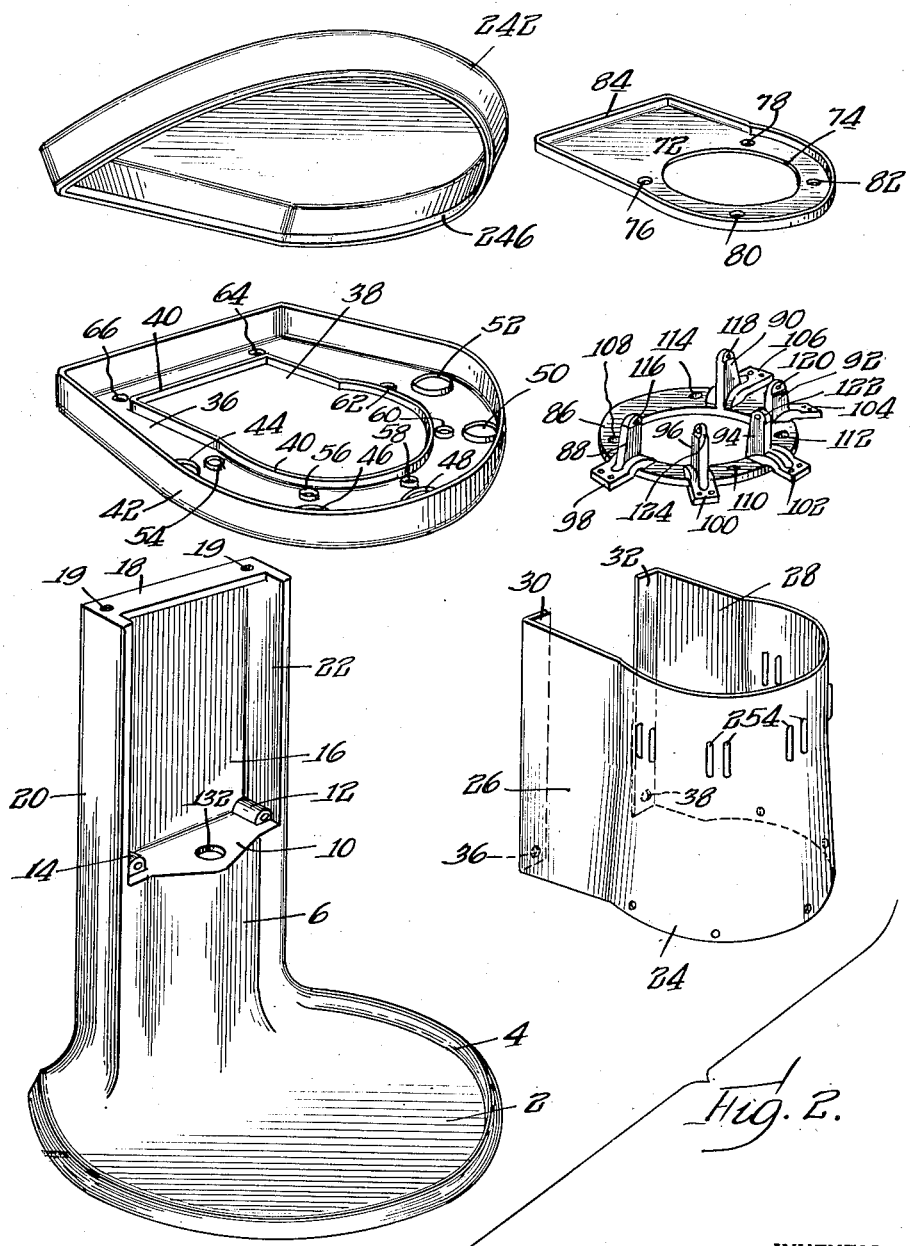
Figure 2 is a perspective view of the associated parts that make up the device.
Figure 3:
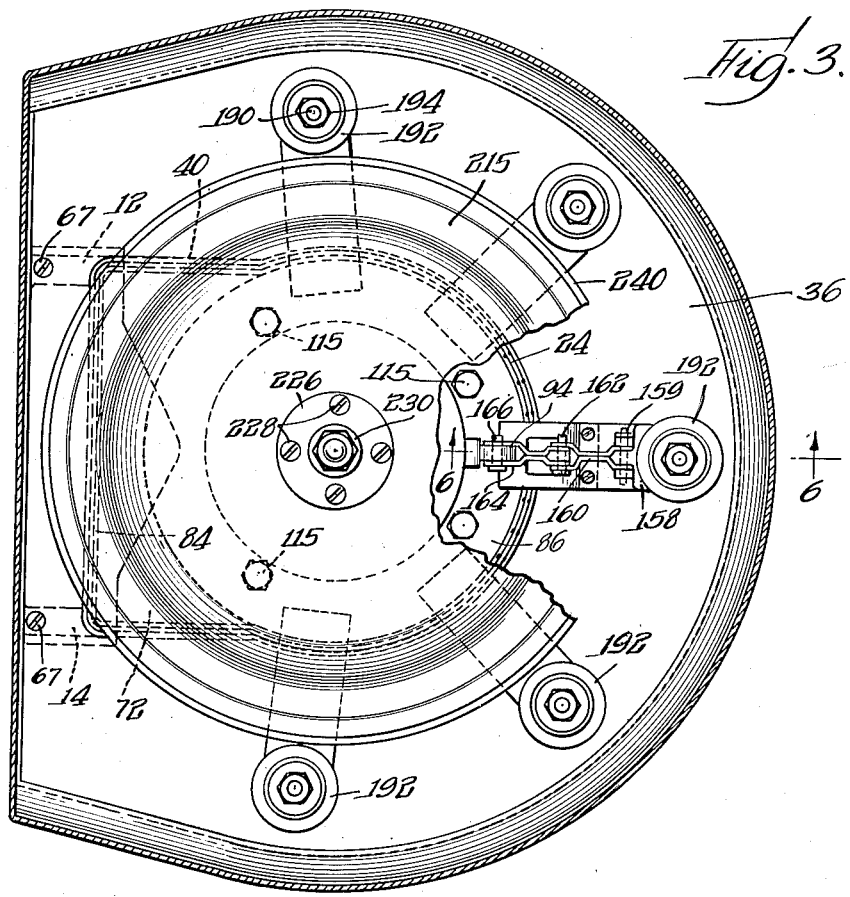
Figure 3 is a plan section taken on the line 3—3 of Figure 1.
Figure 4:
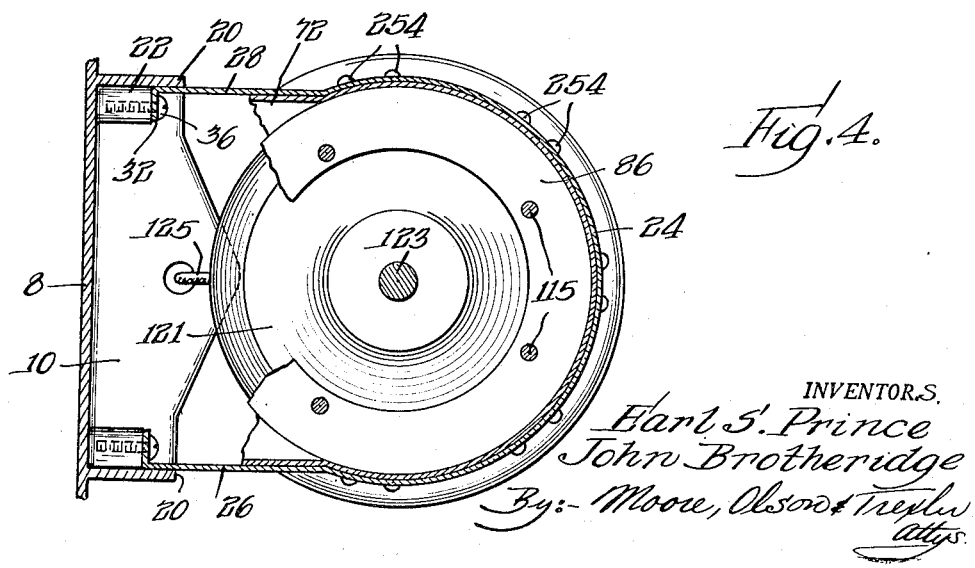
Figure 4 is a plan section taken on the line 4—4 of Figure 1.

Referring now to the drawings in detail, the machine in general comprises a flat stationary base 2. As shown in Figure 2, this base 2 is generally circular although it may be substantially rectangular, and is provided with a depressed portion and a surrounding upstanding rim 4 providing a shallow tray. By reference to Figure 1 it will be noticed that the rim 4 of the tray projects outwardly beyond the vertical longitudinal axis of the center mixing spindle, whereby the drip from the mixing spindle will be caught by the tray.

This tray is a casting of suitable metal and is formed at its rear with a preferably integral, vertical, hollow, upstanding column providing a front wall 6 and a flat rear wall 8. About midway of its height the front and rear walls are connected by a transverse, horizontal, integral wall 10 forming a horizontal support for the mixing head and housing. This wall 10 is provided with two horizontally disposed, spaced, threadedly bored lugs 12 and 14 at opposite sides thereof, as shown in Figure 2, and which lugs are set back a slight distance from the front wall 6 of the bottom portion of the column. Above the transverse wall 10 the column continues upwardly as at 16 and terminates in an inwardly extending horizontal flange 18. The column is provided with the upstanding side walls 20 and 22 and from the transverse wall 10 upwardly to the transverse upper wall 18 is open at the front, and is closed by the bottom front wall 6.

A mixing head is supported from this column. The head includes a motor housing comprising a preferably sleeve-like portion 24 of sheet metal and a pair of spaced, rearwardly depending flanges 30 and 32 adapted to be fastened in position on the transverse horizontal wall 10 and within the side walls 20 and 22 and the top wall 18. In addition there is provided a top horizontal plate 36 having a central opening 38 and an upstanding peripheral flange 40 around the opening. The plate 36 is provided with a peripheral upstanding larger flange 42 and a series of spindle holes 44, 46, 48, 50 and 52 and a series of smaller holes 54, 56, 58, 60 and 62. In addition the rear portion of the plate 40 is provided with the two holes 64 and 66.

A sheet metal motor plate 72 is provided with a relatively large aperture 74 at one end and four holes 76, 78, 80 and 82. In addition, the motor plate is provided with an upstanding integral rim 84. This rim is adapted to seat in the upstanding flange 40 of the top plate. The motor plate is adapted to carry a spider comprising an integral metal casting which comprises a circular rim 86 provided with five upstanding posts 88, 90, 92, 94 and 96. These posts are spaced equidistantly around the forward arcuate portion of the rim 86 and in addition each post includes an outstanding radially projecting tongue or lug 98, 100, 102, 104, and 106. The rim is likewise provided with a series of holes 108, 110, 112 and 114 which holes register with the holes 76, 78, 80 and 82 of the motor plate. Each upstanding post is in turn provided with a horizontally extending hole 116, 118, 120, 122 and 124, hereinafter described. As shown clearly in Figure 1, the flanges 84 of the motor plate, and the vertical flanges 30 and 32 and the flange 40 of the top plate, are positioned in contacting relation and are welded together. The top plate is bolted as at 67 through the holes 64 and 66 of the top plate into threaded holes 19 in the upper transverse horizontal partition 18 of the base whereby in conjunction with the fact that the bottom portions of the flanges 30 and 32 are bolted as at 36 and 38 into the threaded lugs 12 and 14 of the bottom horizontal flange 10 of the base, means is provided for effectively and rigidly supporting the top plate, the motor plate, the spider and motor housing, from the base. The same bolts 115 that attach the spider 86 to the motor plate 72 likewise pass into the top portion of the motor and affix it rigidly to the motor plate and spider whereby the motor 121 is mounted in the head with the motor spindle 123 upstanding therefrom. The bottom of the motor is provided with electrical conduits 125 and 126, the latter connecting with a switch 128 having a control member 130 which projects beyond the lower end of the skirt portion 24 of the housing. The electrical cord 125 passes downwardly through an opening 132 in the flange 10 of the base and thence downwardly through the column between the front and back portions 6 and 8 respectively, and thence out through the open bottom of the column for connection to a source of current.

As shown clearly in Figure 8, the outwardly extending tongue 102 of the spider is provided with a flat portion 134 and is provided with a pair of fastener openings 138 adapted to have fastened thereto by means of bolts 144 a tempered flat spring metal piece 146 which in turn is provided with holes 148. Screws 150 pass through this plate and thread into holes 152 formed in a laterally projecting lug 154 of a circular bearing housing 156 whereby the bearing housing is resiliently mounted on the spider by means of the spring plate 146. The bearing housing is adapted to project through any one of the openings 44, 46, 48, 50 and 52 of the top plate. The bearing housing at its upper end includes a pair of perforated ears 158 through which, by means of a pin 159, is pivotally connected a link 160 perforated at its outer end to receive a pin 162 which pivotally connects the link 160 with another link 164 in turn pivoted as at 166 in the hole of one of the uprights or standards 94 carried by the spider 86. The two links 160 and 164 together with the three pivots 166, 159, and 162 form a toggle joint link. Passing over the pin 162 is the slotted portion 168 of an extension 170 of a plunger 172. This plunger is provided on its bottom portion with a peculiarly formed slot 174 conformed to receive the rim of a cup in the manner shown substantially in the Brotheridge Patent 2,218,808 of October 22, 1940. In addition, surrounding the upper portion of the plunger 172 is a coil spring 176 which has its bottom end contacting against a shoulder 178 on the plunger portion and has its top portion pressing against the underside of the two links 160 and 164 about the pin 162. The function of the spring is normally to force the plunger 172 downwardly to a point where the pivot 162 is slightly below the horizontal level of the two centers of the pivots 159 and 166 whereby the toggle is in a position which tends to keep it as shown in Figure 6. However, upon raising of the plunger 172 by the insertion of the upper edge of the rim of the cup in the slot 174, the plunger 172 is moved upwardly, compressing the spring 176 and forcing the links 160 and 164 of the toggle upwardly. Since the pivot point 166 is fixed, the other pivot 159 will be pulled inwardly toward the pivot 166 which will thus pull the bearing housing 156 inwardly.

The upper end of the bearing housing is provided with a flange seat 180 to receive a ball bearing 182 to take the thrust of the mixing spindle 186 against the large driving wheel. A guard 188 closes the opening about the bearing 184. The upper end of the mixing spindle 186 is threaded as at 190 and carries a preferably metal friction roller 192. A cap 194 is threaded on the spindle 186 to hold the roller 192 in place. The central portion of the bearing housing 156 is formed as a lubricant reservoir. The bottom portion of this housing is closed by a hard Babbitt or bronze bearing 198 and in addition there is a slinger means 200 which is pressed onto the spindle and against the shoulder portion 202 of the spindle 186. This slinger means includes an upstanding circular, outwardly extending flange 204, the outer end of which overlies an inwardly and upwardly projecting flange 206 on a sleeve-like closure 208 attached to the bottom of the bearing and passing through one of the openings such as 50 in the top plate. This slinger means 200 acts as a device for keeping the drink out of the bearing as the slinger rotates at high speed, and by centrifugal force will prevent the drink from entering the bearing 198 while the spindle is in motion. This sleeve-like closure 206 in effect forms an oil trough. There is a wick 210 which passes through an opening 212 in the bottom of the tubular bearing housing 156 and extends downwardly into this sleeve-like portion 206, the action being such that any excess oil escaping past the bearing will collect in the trough 206 and by capillary attraction will be conducted back up into the oil reservoir 210. The bottom of the spindle is provided with the usual type of mixing devices 212 and 214 affixed in any desired manner and any desired configuration thereon and thereinto. It will be noted that there are preferably five of these mixing spindles projecting downwardly through the bottom of the housing and that they are equally spaced in a half circle and extend radially of the central motor spindle 123. It will be understood each one of the mixing spindles 186 has on its upper end a metal driving wheel 192.

The claims of the present application are directed to the construction of the motor driving wheel and the manner in which it is attached to a central motor driven driving spindle 123. This motor driving spindle has affixed thereto a relatively larger, centrally disposed driving wheel 215 which in the present instance is preferably formed of sheet metal. This driving wheel 215 is comprised of an upper sheet metal disk 216 and a lower sheet metal disk 218. These two disks are secured to the spindle by means of a central circular block 220 having an outstanding lower flange 222 provided with suitable threaded perforations. In addition there is a spacing ring 224 likewise having perforations, and an upper, ring-like cap 226. A series of bolts or screws 228 pass through registering openings in the spacing ring 224 and into the threaded flange 222 of the block 220. The inner circular edges of the two disks 216 and 218 are received between the upper edges of the flange 222, the lower edges of the spacing ring 224 and the upper edge of the spacing ring 224 and the top ring-like cap 226, whereby the two disk-like portions are thoroughly clamped rotatably to the motor spindle. The upper portion of the motor spindle is threaded and is adapted to receive a wheel puller nut 230 which passes partially through an opening in the upper ring-like cap 226. An integral flange 231 on the nut is larger in diameter than said opening. The nut 230 with flange 231 cooperates with cap 226 to act as a wheel puller nut when it is turned off the spindle. It pulls the large driving wheel off the tapered spindle. The two disks 216 and 218 are shaped to converge in the manner shown in Figure 1. They extend slightly upwardly and meet at an annular locus 232 from which location they extend in parallelism and in juxtaposed, overlapping relation as at 234. The portions in contact as at 234 are welded together whereby to form an integral, rugged driving disk. Each disk is provided with one half portion of a rim receptacle such as 236 and 238, which is adapted to receive a rubber tire or rim 240 which may be removed for replacement or repair. The particular configuration of the driving disc provides clearance for the toggles formed by the links 160 and 164 and the pins 162 while requiring a minimum of overhead room.

A sheet metal closure 242 having a circular flange 244 extends over the top of the housing and carries an inwardly extending lip 246 which lies within the upstanding rim 42 of the top plate whereby to form a dust-proof casing for the top of the housing. The top of this upper casing 242 is flat.

It will be noted that by reason of the fact that the tray 2 is stationary and that the depending spindles do not move orbitally with respect to the base, a very convenient arrangement is provided whereby when a drink is put under any particular spindle and moved upwardly into the position so that the bottom of the cup 248 is caught by the lip 250 of the support stud 252 carried by the bottom of the skirt portion of the housing, the cup will be disengageably held in position with the spindle 186 projecting downwardly thereinto so that this cup will remain in this particular location so that an operator will always be able to locate and distinguish that particular cup from any other cup. Hence the location of a cup once put into the machine is definitely fixed at all times until removed. The pairs of vertically elongated ribs 254 are formed in spaced apart relation upon the sheet metal housing 24 just opposite each one of the mixing spindles and relatively close to the position of the depending plungers 174. The lower ends of these ribs, as shown in Figure 6, are tapered as shown at 255 so that as the cup is pushed upwardly the upper lip of the cup will strike this tapered surface 255 and guide the upper lip of the cup into the slot 174 of the plunger 172.

Therefore these ribs also act to guide the edge of the cup into the cup holder and to guide the cup into position for mixing. The spacing between the ribs forms a vertical track for the periphery of the cup so that the operator can correspondingly position the cup by the feel of the edge of the cup against the two ribs.

In connection with the operation of the device, the insertion of the cup, as hereinbefore described, raises the plunger, thereby causing the bearing housing to be moved inwardly against the tension plate 146 and against the tension of the spring 176 so as to cause a roller 192 of a particular spindle to engage the rubber tire 240 of the circular driving wheel whereby that particular spindle is directly rotated at a relatively high rate of speed. Each particular spindle is thus capable of being selectively controlled by engaging or disengaging its driving wheel from the constantly rotating central driving wheel formed by the disks 216 and 218 and the tire 240. When the cup is released and moved downwardly the spring mounting 146, which has been put under tension, will straighten out and carry the smaller driving roller 192 out of contact with the rotating central driving wheel 40, whereby to assist the spring 176 in this purpose, and this spring 176 of the plunger then carries the central pivot pin 162 downwardly below the level of the pivots 166 and 159 whereby to lock the small roller out of driving engagement so that it cannot be inadvertently thrown into engagement unless another cup is inserted into mixing position.

It is apparent that many widely different embodiments of this invention may be made without departing from the spirit and scope thereof, and therefore it is not intended to be limited except as indicated in the appended claims.

Having thus described our invention, what we claim as new and desire to secure by Letters Patent is:

1. A master driving wheel for a multiple spindle drink mixer or the like comprising a pair of sheet metal disks having substantially registering central apertures, the inner portions of the disks being spaced apart and being bent laterally in a common direction but at different angles to provide spaced, converging portions, each of said spaced, converging portions being substantially conical and joining one another along a circular locus, said disks outwardly from said initial junction of contact being bent reversely at an obtuse angle to said conical portions and lying parallel and in contact one with the other and affixed together, the outer peripheral walls of said disks beyond said initial contacting portions of said disks being bent substantially at right angles and then flanged outwardly to provide a peripheral channel, a tire mounted in said channel, and means for clampingly uniting the inner registering edges of said discs in spaced apart relation.

2. A driving wheel comprising a pair of sheet metal disks having central registering apertures, a central circular block having an outstanding flange provided with suitably spaced apart threaded perforations, a spacing ring having registering perforations and an upper ring-like cap likewise having registering perforations, said spacing ring being disposed between the lower flange of the central block and said ring-like cap, and the inner edges of said disks at their central apertures being clamped between said spacing ring and said flange, said spacing ring and said cap, and bolts passing through said registrations of said cap, said ring and said flange of said circular block to hold the same and the inner edges of said sheet metal disks in assembled rigid relation, said circular block having a cone-shaped central opening fitting onto the cone-shaped drive spindle of a motor, the upper end of the motor spindle being threaded, a wheel puller nut threadedly mounted on said outer threaded end of the motor spindle, and said ring-like cap having a central opening through which said puller nut is adapted partially to pass, the opening in said cap fitting the puller nut threaded onto said spindle whereby when the puller nut is turned off said spindle it serves to pull the large driving wheel off the tapered spindle of the motor.

3. A master drive for a multiple spindle drink mixing machine comprising a central circular block having a flanged portion, a first disk having a central aperture the inner edges of which are mounted upon said flanged portion, a separating ring adapted to clamp said first mentioned inner disk portion against said flanged portion, a second disk having a central opening and a locking ring for clamping the inner circular portion of said second disk against said separating ring, said disks being formed of sheet metal and each having its annular portions from the clamped inner peripheral portions extending outwardly in a single conical surface to a zone disposed substantially outwardly of each of said disks, said portions of said disks being conical, spaced apart but converging outwardly and contacting substantially inwardly of the outer peripheries of said disks and for an extent radially of said disks substantially less than the radial length of said inner adjacent and angularly disposed portions of said disks, the outer portions of said disks being bent at an opposite obtuse angle to said surfaces of said inner portions and being parallel and rigidly fastened together, the outer portions of each of said disks being provided with a laterally extending flange having a bent tip, said tips of said flange portion being bent inwardly to provide a tire channel for a rubber tire mounted in said channel.

4. A master drive wheel comprising a pair of sheet metal disks, said disks having registering central apertures and the walls of the disks circumferentially around said apertures being spaced apart, and means formed at the central registering openings of said disks for rigidly clamping the same in spaced apart relation, portions of said disks lying outwardly of said clamping means being spaced and each such portion of each disk being conical, said conical portions converging at an acute angle and extending substantially radially outwardly the major portion of the radial length of said disks to join one another, said disks from their initial junction of contact being disposed in parallelism and in contact and bent at an obtuse angle extending oppositely to the angle of said converging portions, said contacting portions of said disks being welded together, the peripheral free ends of said disks being formed with complementary flange portions providing a peripheral continuous channel for the disks, and a rubber tire disposed in said channel.

5. A master driving wheel comprising a pair of sheet metal disks having central registering apertures, the portions of the disks immediately surrounding said apertures being spaced apart and outer portions of said disks being juxtaposed and parallel and integrally united, the outer peripheral walls of the disks forming a peripheral channel, a rubber tire disposed in said channel, complemental members clampingly uniting the inner spaced walls of said disks in rigid, united, spaced apart relation, one of said complemental members comprising a sleeve formed with an axial bore for the reception of a motor shaft, said sleeve at one end having a radially extending circular flange forming a clamping shoulder, a spacing ring confronting said flange and surrounding said sleeve, and a second clamping ring adjacent and disposed on the opposite side of and having a side wall confronting said ring, said second ring having an annular portion surrounding the end of said flanged sleeve and having a lateral extension of greater radial dimension than said annular portion concentrically surrounding but annularly spaced from the free end of said motor shaft, and fastening means passing through said flange and rings and inner circular edges of said disks for clamping the inner edges of said disks and said sleeve and rings together, and a nut threaded on the threaded free end of said motor shaft and lying within and annularly spaced from the annular lateral extension of said second clamping ring to secure said wheel on said motor shaft and acting as a puller nut when unscrewed from said motor shaft to remove said wheel from said shaft.

EARL S. PRINCE.
JOHN BROTHERIDGE.

REFERENCES CITED

The following references are of record in the file of this patent:

UNITED STATES PATENTS

| Number | Name | Date |
|---|---|---|
| 294,730 | Fulton | Mar. 4, 1884 |
| 893,889 | Zamboni | July 21, 1908 |
| 940,106 | Wulff | Nov. 16, 1909 |
| 1,379,352 | Lougheed | May 24, 1921 |
| 1,683,738 | Stanley | Sept. 11, 1928 |
| 1,932,289 | Jarris et al. | Oct. 24, 1933 |

FOREIGN PATENTS

| Number | Country | Date |
|---|---|---|
| 249,789 | Great Britain | Apr. 1, 1926 |